United States Patent [19]

Willey

[11] Patent Number: 5,788,313
[45] Date of Patent: Aug. 4, 1998

[54] MOUNTING ARRANGEMENT FOR MOTORCYCLE WINDSHIELD

[76] Inventor: Barry A. Willey, 727 Ela Rd., Inverness, Ill. 60067

[21] Appl. No.: 721,451

[22] Filed: Sep. 27, 1996

[51] Int. Cl.⁶ .................................................. B62J 17/04
[52] U.S. Cl. ............................................................ 296/78.1
[58] Field of Search ........................................... 296/78.1

[56] References Cited

FOREIGN PATENT DOCUMENTS

| | | | |
|---|---|---|---|
| 1100424 | 9/1955 | France | 296/78.1 |
| 199078 | 7/1938 | Switzerland | 296/78.1 |
| 977123 | 12/1964 | United Kingdom | 296/78.1 |

OTHER PUBLICATIONS

Trade Literature—Rev. 5-96—2 pages—Harley Davidson Motor Company—Windshield Trim Kits.

*Primary Examiner*—Dennis H. Pedder
*Attorney, Agent, or Firm*—James T. FitzGibbon

[57] ABSTRACT

A windshield assembly for a motorcycle allows attachment to fork tubes of diverse spacing by using links with an offset intermediate portion. The links may be reversed end to end to alter the spacing between ends attached to fork tube clamps.

9 Claims, 3 Drawing Sheets

MOUNTING ARRANGEMENT FOR MOTORCYCLE WINDSHIELD

BACKGROUND OF THE INVENTION

The present invention relates generally to windshield assemblies and more particularly to assemblies primarily intended for use with motorcycles or like vehicles.

Motorcycle windshields of various designs have long been known and are a popular accessory used by a large number of riders with various objects in mind. Some shields or farings are exceptionally large and primarily intended to provide maximum coverage for riders of motorcycles adapted for long distance touring. Other shields may be adapted to different purposes, such as being intended primarily to streamline the cycle for racing applications or the like.

In recent years, with the advents of the so-called "cruiser" type motorcycles, there has been an increasing demand for shields which provide a stylish appearance and a somewhat minimal wind protection. In these units, the concept of providing some wind protection is important but in addition, the aspect of style is important. Where possible, a significant style "statement" can desirably be achieved at low cost.

Because of the seating position of many such cruiser style motorcycles, that is, where the seat height is relatively low compared to the height of the fuel tank, the front fork and the height of the headlight, a high screen is not necessary to provide at least some desired degree of protection from the wind.

Because of the nature of windshields of this type, that is, the need for some wind protection at minimal expense consistent with the desire to project a high quality image, a concern has arisen, particularly among dealers of different brands of motorcycles that have some overall similarity but differ from one another in size and constructional details. In this connection, a problem has existed in the windshield field wherein it is desired to have a high quality, "custom" appearance, usually achieved by providing metal surfaces of generous size with a high luster or polished finish. The problem of the cost of such materials is magnified from the standpoint of dealer and distributor stocking where each particular shield made for a different application must have bracketry or mounting hardware that differs from model to model. In such an instance, it is either necessary to stock a large number of windshields having different part or identity numbers, or it is necessary to supply a reduced number of shields, but a large number of different kinds or styles of mounting hardware. This in turn creates inventory problems and creates difficulty in selling and returning the products if the correct size is not sold to the user. Prior attempts to provide "universal" products have resulted in components that have an unduly functional, somewhat low quality appearance.

Accordingly, there has been a recent demand for a small or cruiser type mini-windshield that would be adaptable to cycles of a wide variety of sizes without betraying its universality.

In particular, there is a need for providing such a nearly "universal" shield assembly that would retain a high quality image and be able to provide a custom appearance when installed on a wide variety of motorcycle types and styles.

In view of the failure of the prior art to provide such a shield assembly, it is an object of the present invention to provide an improved, highly adaptable motorcycle windshield.

Another object of the invention is to provide a motorcycle windshield wherein a mounting assembly, may, by a simple operation, be altered so as to render the windshield adaptable to motorcycles of different sizes and styles.

Yet another object is to provide a motorcycle windshield which is securable to the front suspension portions of various cycles wherein the downtube components of the suspension have widely varying tube diameters and intertube spaces between them.

A further object of the invention is to provide an universal type mounting assembly wherein the adaptability feature is not readily visible, thus imparting a custom made, high quality appearance to the final product.

A still further objection of the invention is to provide an universal adjustment system wherein the universal feature is substantially invisible in use, and yet wherein adaptability is easy to achieve by simple manipulation of parts.

An additional objection of the invention is to provide an adjustable windshield mounting assembly wherein the adjustable parts may be of a high quality appearance having exterior surfaces suitable to being polished, chrome plated, or the like.

Another object of the invention is to provide a shield assembly which provides a gross or large scale adjustment feature utilizing reversible links and a finer or vernier adjustment feature comprising slotted shield mounting ears or the like.

Yet another object of the invention is to provide an adjustable mounting system of the type herein described wherein variations in the diameter of fork tubes or downtubes may be accommodated by using clamp liners or the like which are substantially invisible in use.

The foregoing and other objects and advantages of the invention are achieved in practice by providing a motorcycle windshield and mounting assembly comprising a small windshield made from a relatively rigid, transparent material having an exterior cross-piece, a pair of slotted shield mounting brackets, a pair of links each including an offset center section and a pair of fork receiving clamps, with the parts being constructed and arranged so as to permit front-to-rear (and in some cases, also left-to-right) reversal of the links to alter the offset available to the fork clamps and to provide slotted portions in the mounting ear so as to permit fine tuning of the size adjustment of the shield, with such adjustment features being relatively invisible from the exterior so as to provide a custom appearance in the finished product.

The exact manner in which the foregoing and other objects and advantages of the invention are achieved in practice will become more clearly apparent when reference is made to the following detailed description of the preferred embodiments of the invention set forth by way of example and shown in the accompanying drawings, wherein like reference numbers indicate corresponding parts throughout.

DESCRIPTION OF THE PREFERRED EMBODIMENTS OF THE INVENTION

Figure 1:
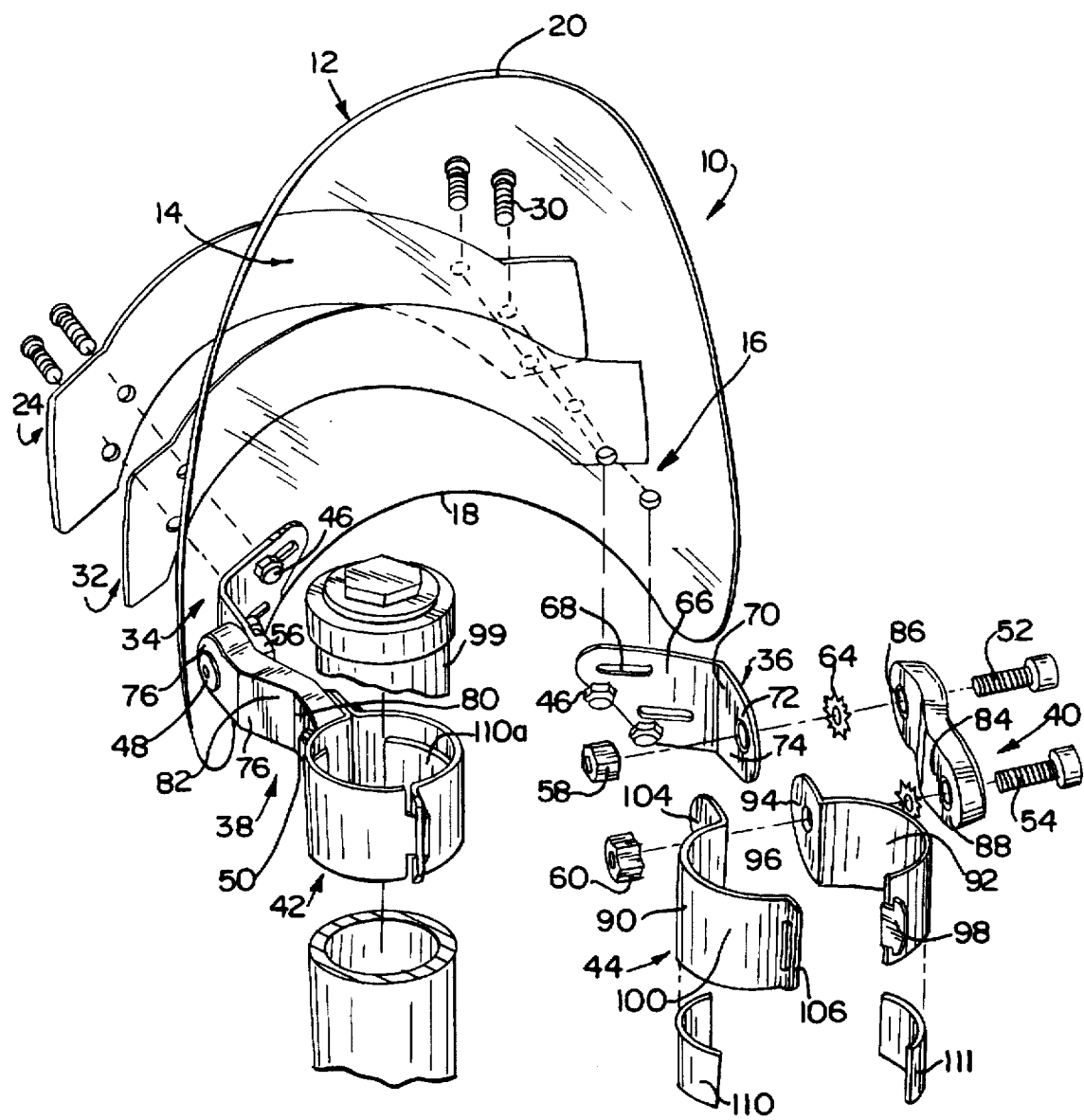
FIG. 1 is an exploded view of a shield and mounting hardware assembly made according to the present invention.
Figure 3:
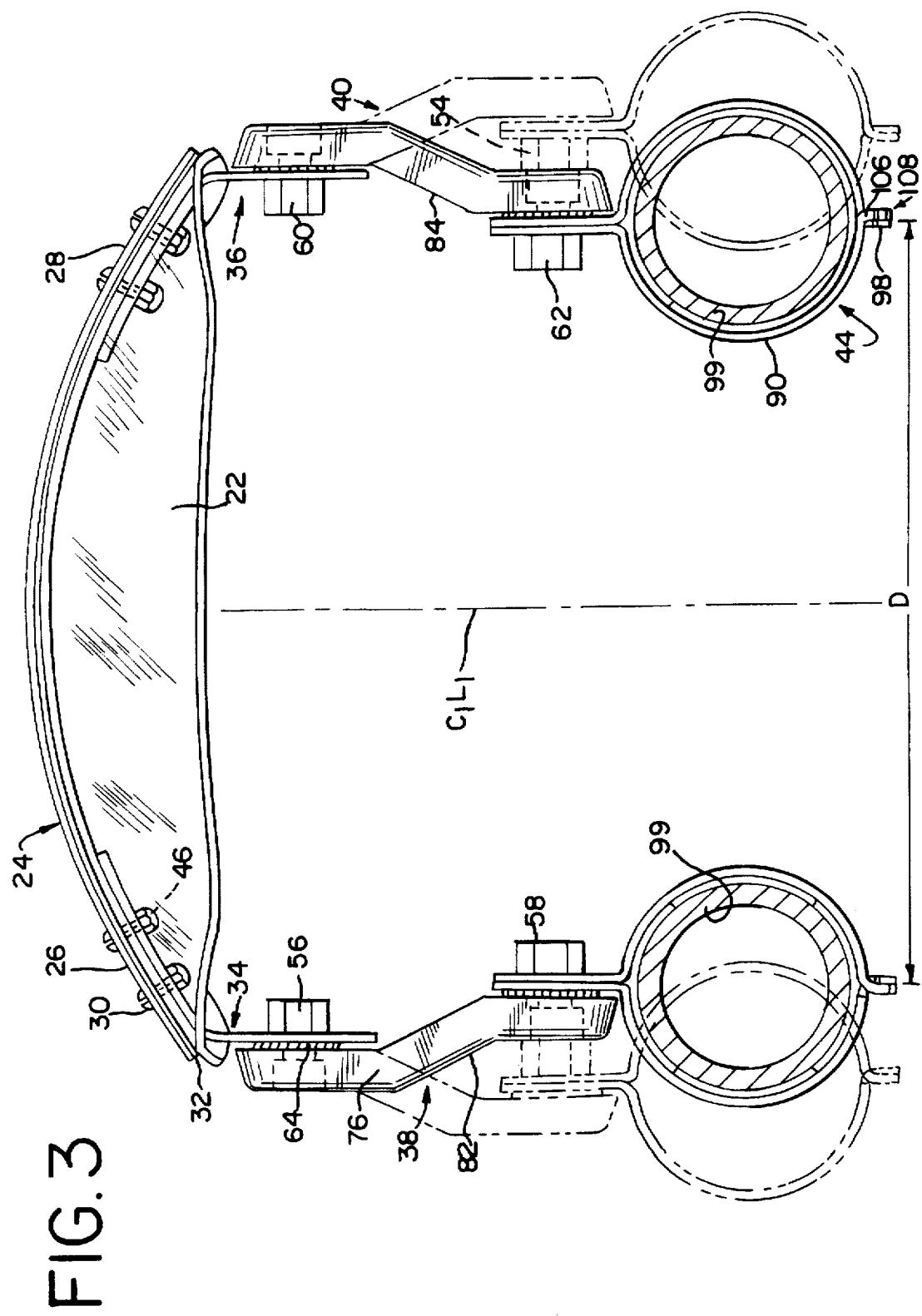
FIG. 3 is a top view partly in plan and partly in section, and showing the shield mounting system, including the reversible link feature of the invention.

Referring now to the drawings in greater detail, there is shown in FIGS. 1 and 3 a windshield and mounting assembly generally designated 10 having a screen portion generally designated 12 and having an upper transparent section generally designated 14, a lower, hardware engaging portion generally designated 16 including a curvilinear lower edge 18. The upper, outer edge 20 is shown to have a generally elliptical shape substantially as illustrated. A front surface portion 22 of the screen 12 has an exterior cross piece generally designated 24 extending there-across and this cross piece 24 is shown to be made from generally flat, highly polished metal stock in a curvilinear configuration in plan, so as to provide swept back end portions 26, 28. As shown, fasteners 30 with decorative heads are visible on the front surface of the cross piece 24. An optional, but normally desirable feature of the assembly is the provision of a gasket 32 positioned between the front surface 22 of the screen 12 and the rear surface 23 of the cross piece 24.

Referring now in particular to FIG. 1, a number of additional elements are shown, including a pair of left and right hand mounting brackets generally designated 34, 36, a pair of reversible, left and right hand shield positioning links generally designated 38, 40, and a pair of left and right hand clamp assemblies generally designated 42, 44. Fasteners for the preferred form of system include a plurality of acorn nuts 46 used to cooperate with the shield mounting fasteners 30, front and rear, left and right hand link positioning fasteners 48, 50, 52, 54, (preferably polished Allen-head screws) each cooperating with captive nuts 56, 58, 60, 62. In FIG. 1, the nuts 58, 60 are shown in exploded relation, but it is understood that these are preferably welded in place. Optionally, lockwashers 64 may be provided if desired.

Referring now to the construction of the mounting brackets 34, 36, these elements being substantially identical except for being mirror images of each other, only one bracket 36 will be described in detail. This bracket is shown to include a shield engaging ear portion 66, having plural elongated slots 68, and joined at an angularly related fold line portion 70 at which the shield ear 66 joins a link engaging ear 72. This ear 72 preferably has one of the captive nuts 58 attached thereto by welding and includes a fastener receiving opening or eye 74. Preferably, the shield engaging ear 66, in position of use on the motorcycle, extends at about a 120° included angle from the link engaging ear, which in turn preferably extends substantially longitudinally, i.e., along the axis of the directional vehicle. An important part of the invention are the shield positioning links 38, 40. These links are substantially identical to each other, but reference will be made to both links 38, 40 in order to illustrate all the features thereof. Thus, link 38 includes a contoured exterior polished or decorated surface 76, and includes a first end portion 78, a second end portion 80, and a generally centrally disposed offsetting section 82. The inner surface 84 may but need not be generally planar. The link 40 also includes a pair of fastener receiving openings 86, 88, as does its counterpart, link 38. In one presently preferred form of invention, the link is about four inches long and the offset, measured to corresponding surfaces, is about ½ inch for each link.

Referring now to the fork tube clamp generally designated assemblies 42, 44, these are also substantially identical, although reference will be made to both to illustrate their construction in detail. As shown in FIGS. 1 and 3, the clamp unit generally designated 44, for example, includes inner and outer, semi-cylindrical sections 90, 92, with one end of the outer section 92 including a flange 94 with a fastener receiving opening 96 therein, and with the other end of the section 92 including a tab 98 extending rearwardly therefrom. The inner assembly 90 includes its own semi-cylindrical section 100, a flange 104 for cooperating with the flange 94, and a slotted rear flange 106, the slot therein being adapted to receive the tab 98 in such a way that, with the unit assembled but not clamped, a hinge generally designated 108 is provided at the rear of the clamp assembly generally designated 44.

As shown, a pair of spacers in the form of clamp liners 110, 111 are shown to be adhesively or otherwise securable to the inner surfaces of the semi-cylindrical sections 90, 92 of each of the clamp units. In FIG. 1, the liners or spacers 110, 111 are shown in exploded relation, it being understood that, in use, the liners would be positioned within the clamps as shown at 110a for example.

Preferably, these liner units 110, 111 are optional units made from a stiff elastomer that contain a pressure sensitive backing adhesive (not shown) for positioning in the clamps if the fork tube with which the unit is adapted to be used is smaller than that about which the clamp assemblies 42, 44 will form a tight fit.

Referring now to the assembly of the unit and the fitting the same to the motorcycle, and referring for example to FIG. 3, a center-to-center distance shown as "D" in FIG. 3, is established by a simple measurement. If this distance is relatively short, for example, 8.5-9 inches, the links are positioned as shown in the solid line portion of FIG. 3, i.e., the same as they are shown in FIG. 1, with the trailing ends of the links being spaced more closely apart than the leading ends thereof.

The clamps are assembled by placing the tab 98 within its intended position in the slotted flange 106, to hold the clamp sections 90, 92 together. These are placed over the ends of the fork tubes 99, the lockwasher 64 is placed outside the flange 94 and the fastener 54 placed through the opening 88 and secured to the captive nut 62. The same process is repeated for the left side clamp. The acorn nuts 46 on the ends of the fasteners 30 are loosened and the shield mounting brackets 34, 36 are manipulated so that the ear 66, for example, is aligned with the leading portion of the link 40. When the ears are spaced such that there is correct longitudinal alignment, the fasteners 52, 54 are tightened, as are the nuts 46, securing the shield to the cycle.

If minor adjustments of width are required, these are made by moving the ears 66 on the flange 36 in or out relative to the center line ("CL"—FIG. 5) and doing the same for the counterpart flange 34 so that proper width spacing and alignment are achieved. If the forks have a larger center-to-center distance such as 10 or 10.5 inches, for example, the links 38, 40 are removed from the position shown in FIGS. 1 and 3 and reversed in a front-to-rear orientation so as to assume the dotted line position of FIG. 3.

In this configuration, the trailing ends of the links are farther spaced apart than the leading ends, and this enables a more widely spaced pair of fork tubes to be accommodated. Again, the remainder of the adjustment is made by loosening the acorn nuts and sliding the slotted ears from side to side as indicated. The height of the windshield is adjusted by moving the height position of the clamps 42, 44 and the angle between the links 38, 40, the clamps 42, 44 and the brackets 34, 36. Initially, as described above, the requirement for the use of the optional clamp liners 110, 111 will be made by a pre-measurement or simply manipulating the clamps before they are attached to the links to determine the need for the liners.

Figure 2:
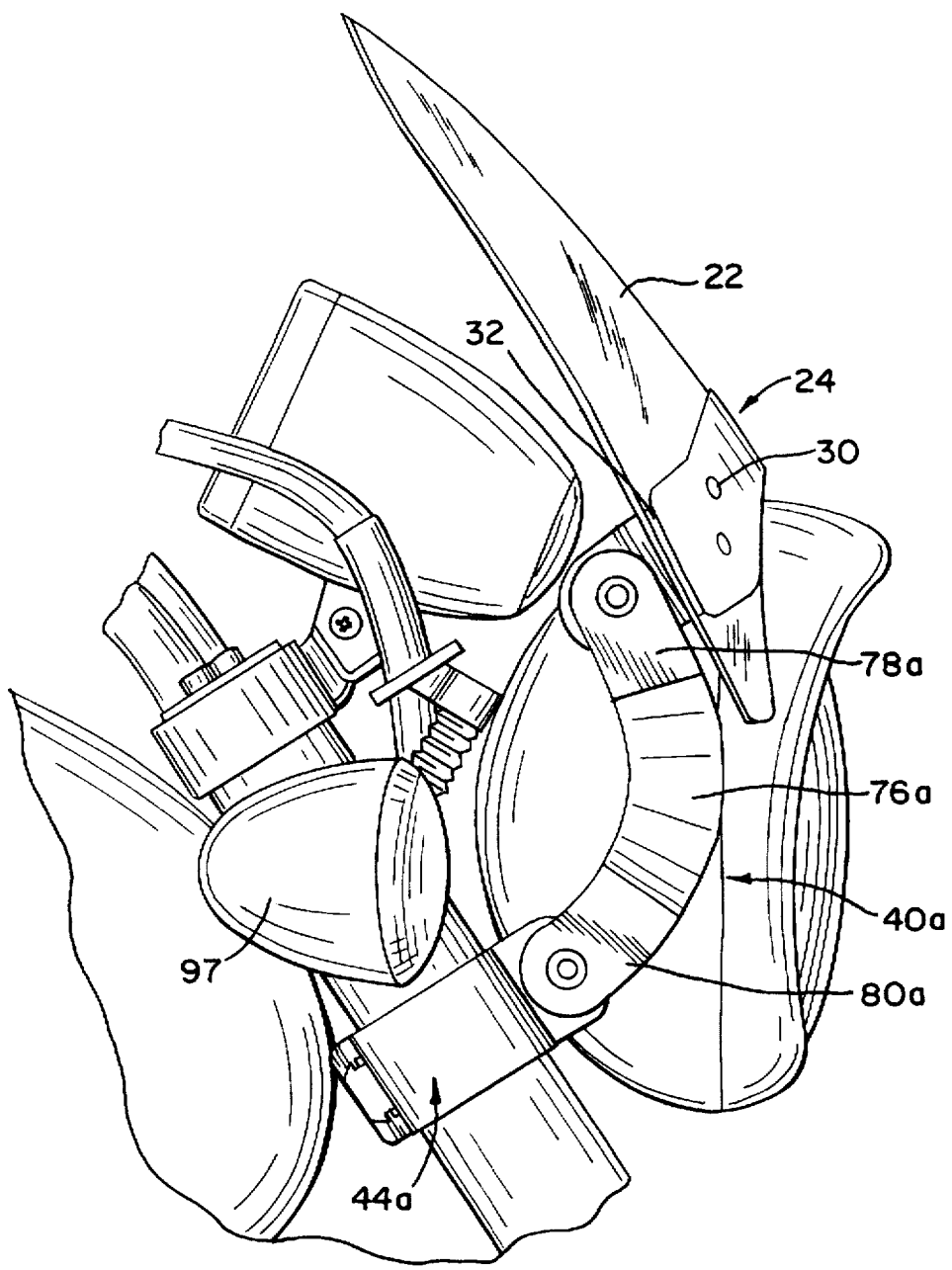
FIG. 2 is a side elevational view of a modified form of the windshield assembly of the invention.

Referring now to FIG. 2, an alternative version of the assembly 10a is shown. Here, all of the elements are the same as their counterparts except that each of the links is of a different configuration in side elevation. Thus, as shown in FIG. 2, a typical modified or "banana" link 40a has an upper leading edge portion 78a and a lower trailing edge portion 80a, with an intermediate or offset portion 82a. In the form shown, the outer surface 76a of the link 40a is a decorative surface similar to the surface shown on the left side of the link 38 in FIG. 1. The clamp 44a for the link 40a is arranged in a lower position so that it may avoid contact with stalk (not shown) supporting the turn signal light 97 shown in FIG. 2. The offset is or may be the same, when viewed from the top, as that of the link shown in FIG. 3.

Functionally speaking, the link is also similar from the standpoint of being reversed. However, the reversal procedure to achieve the narrowing shown with the straight links in FIG. 3 involves not only moving the link leading edge 78a to a trailing edge position 80a, but also involves moving the right hand side link to the left side and vice versa.

Thus, in a typical case, the trailing portion 80a is spaced outwardly of the leading edge portion 78a, and the leading edge portion 78a is at a higher elevational level. With the links reversed front-to-rear and inverted left-to-right, what was formerly the trailing portion is now the leading portion. The decorative surface is still exposed to the outside but the former trailing edge portion is now inside the presently leading edge portion, thus providing the same adjustment range as that shown in FIG. 3.

In other embodiments, the links are the same or similar. In FIG. 2, the position of the link 40a is shown spaced somewhat from the position of the turn signal 99a and its stalk, for purposes of illustration. However, it is understood that in actual application, these parts may be positioned somewhat closer together. As is apparent from FIG. 2, if the straight form of link is to be used, the fork tube clamps would be correspondingly raised so that the shield could be positioned appropriately with respect to the headlight. As pointed out, on "cruiser" motorcycles, the headlight and tank are often relatively elevated compared to the seat height, and a tall windshield is not normally required to meet the desires of such riders. It will thus be seen that the present invention provides an improved windshield assembly and mounting hardware therefore having a number of advantages and characteristics including those pointed out and others which are inherent in the invention. Different constructions, having been shown by way of example, it is anticipated that other variations and modifications to the described form of apparatus will occur to those skilled in the art and it is anticipated that such modifications and changes may be made without departing from the spirit of the invention or the scope of the appended claims.

I claim:

1. A windshield assembly for attachment to a vehicle with a front suspension having opposed downtubes forming a part of a front fork assembly, said windshield assembly comprising, in combination, a screen portion made from a stiff transparent material and a mounting hardware assembly, said screen portion including an upper transparent section and a lower, hardware-engaging section, said mounting hardware assembly including an exterior cross-piece with a decorative front surface, a pair of opposed shield mounting brackets each having a slotted shield-engaging ear and a link-engaging ear with a fastener-receiving opening therein, each of said ears having at least one fastener extending therethrough, through said screen lower section and through said cross-piece to secure said ears to said screen, a reversible, shield-positioning link having opposed first and second end portions and an offsetting intermediate portion, a fork tube clamp assembly including a portion surrounding said fork tube, a portion for receiving a fastener to secure clamp assembly to one of said link end portions, fasteners securing each of said mounting ears to said links and each of said links to said clamp assemblies, said links being removable and reversible from end to end so as to reverse the orientation of said offset and thereby alter the spacing between said pair of clamp assemblies, and thereby, in combination with said slotted ears, rendering said windshield assembly adaptable to fit various vehicles, including those having downtubes spaced different distances apart.

2. An assembly as defined in claim 1 wherein each of said clamp assemblies further includes a tube-engaging liner portion.

3. An assembly as defined in claim 1 wherein each of said clamp assemblies further includes a tube-engaging liner portion, said liner portion being made from an elastomeric material.

4. An assembly as defined in claim 1 wherein said cross-piece is of generally planar construction, said decorative exterior comprising a highly polished front surface.

5. An assembly as defined in claim 1 wherein said shield positioning link includes a plated and polished outer surface portion, thereby achieving a decorative appearance.

6. An assembly as defined in claim 1 wherein each of said fork tube clamps comprises a pair of elements, each including a forward, link-engaging end, an opposite, hinge-forming end and a semi-cylindrical center section.

7. An assembly as defined in claim 1 wherein said screen portion includes a lower edge portion of generally curvilinear form and adapted to closely overlie a vehicle headlight of generally circular shape.

8. An assembly as defined in claim 1 wherein said attachment of said one end of said links to said mounting brackets forms a pivotable connection allowing said shield to be inclined at a desired angle relative to said links.

9. A windshield assembly for attachment to a vehicle with a front suspension having opposed downtubes forming a part of a front fork assembly, said windshield assembly comprising, in combination, a screen portion made from a stiff, transparent material, mounting hardware including brackets secured to said screen portion, fork tube clamps engageable about the outer circumference of said fork tubes, and a pair of shield-positioning links each having opposed first and second end portions and an offsetting intermediate portion, and fasteners securing the respective ends of said links to said brackets and said clamps so as to permit angular adjustment thereof, said links being reversible end-to-end to alter the space between their ends and permitting the same surfaces to face outwardly in both the ordinary and reversed positions of said links.

* * * * *